United States Patent [19]
Furuya et al.

[11] Patent Number: 5,188,276
[45] Date of Patent: Feb. 23, 1993

[54] METHOD AND APPARATUS FOR MANUFACTURING MOTORCAR DOOR

[75] Inventors: Hiroyuki Furuya; Keizaburo Ohtaki, both of Sayama, Japan

[73] Assignee: Honda Giken Kogyo Kabushiki Kaisha, Tokyo, Japan

[21] Appl. No.: 789,499

[22] Filed: Nov. 8, 1991

[30] Foreign Application Priority Data

| Nov. 30, 1990 | [JP] | Japan | 2-128689[U] |
| Nov. 30, 1990 | [JP] | Japan | 2-128690[U] |
| Nov. 30, 1990 | [JP] | Japan | 2-336476 |

[51] Int. Cl.$^5$ .............................. B23K 37/047
[52] U.S. Cl. ...................... 228/6.1; 228/47; 29/430; 29/897.2
[58] Field of Search .............. 228/175, 102, 6.1, 47, 228/47 A; 29/430, 897.2

[56] References Cited

U.S. PATENT DOCUMENTS

| 4,441,645 | 4/1984 | Takagishi et al. | 228/47 A |
| 4,767,046 | 8/1988 | Kumagai et al. | 228/47 A |

FOREIGN PATENT DOCUMENTS

| 60-113782 | 6/1985 | Japan | 228/47 A |
| 62-221979 | 9/1987 | Japan | 29/430 |

Primary Examiner—Richard K. Seidel
Assistant Examiner—Jeffrey T. Knapp
Attorney, Agent, or Firm—Armstrong, Westerman, Hattori, McLeland & Naughton

[57] ABSTRACT

A door for a motorcar is manufactured by a method in which a door inner member is assembled by combining accessory parts such as a sash to an inner panel, a beam is combined to the door inner member and thereafter the door inner member is assembled to an outer panel. The assembling step of the door inner member is divided into a tack-welding step for tack-welding the inner panel and the accessory parts on a welding jig and a reinforcing-welding step for reinforcing-welding the door inner member by welding robots. The beam is charged into a reinforcing-welding station to weld it to the door inner member by the welding robots. An apparatus has a tack-welding station having disposed therein a welding jig, a reinforcing-welding station having disposed therein welding robots, an assembling station having disposed therein an outer panel setting jig, a first transfer apparatus which is provided with a transfer jig, a second transfer apparatus which is provided with a transfer jig, a beam charging apparatus, and a beam setting jig.

5 Claims, 13 Drawing Sheets

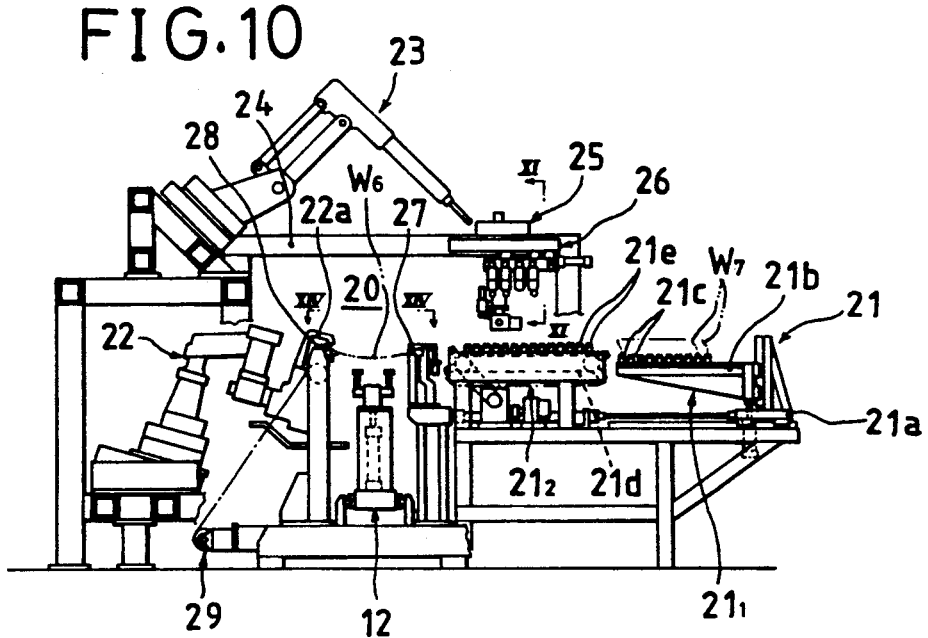

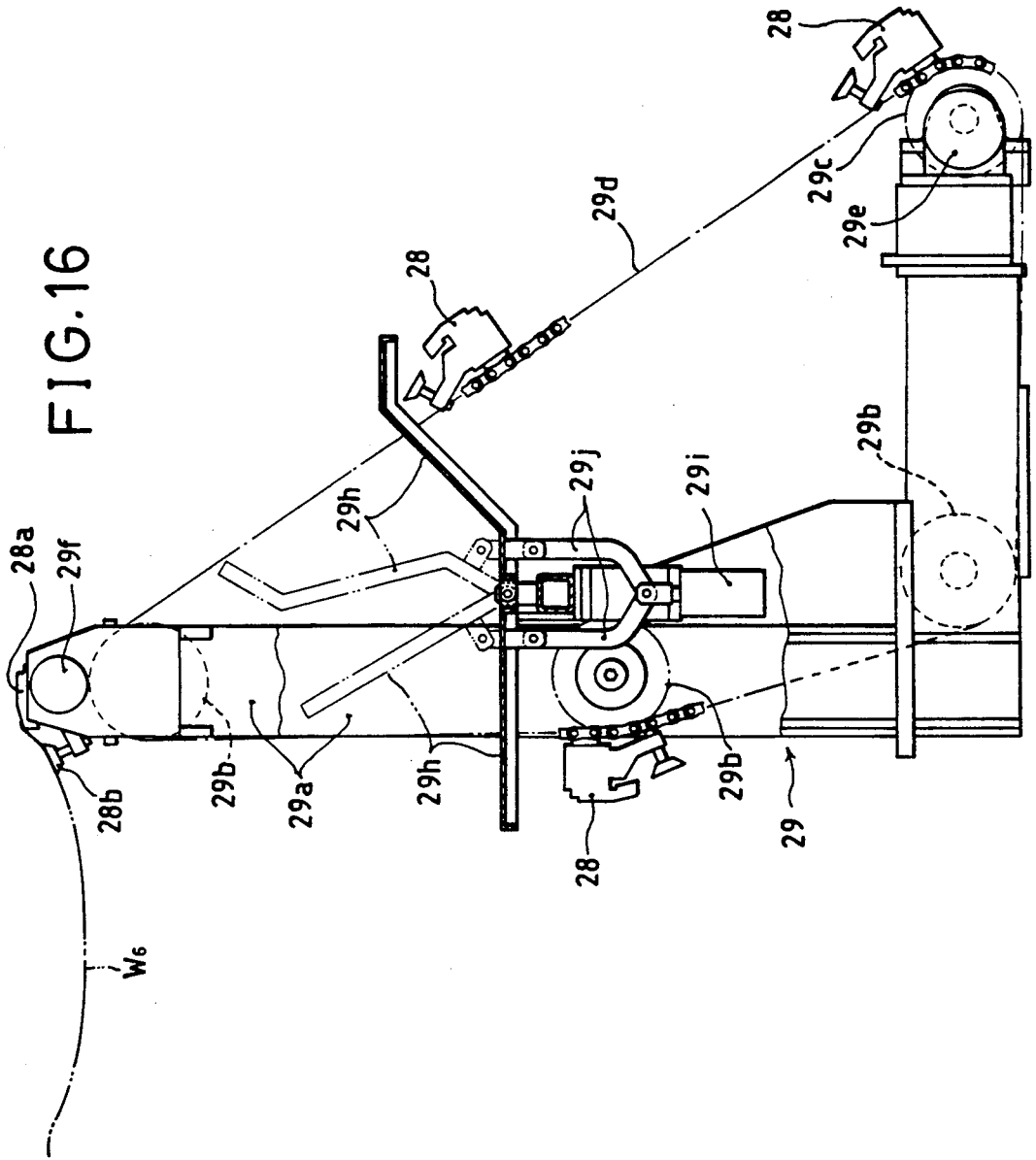

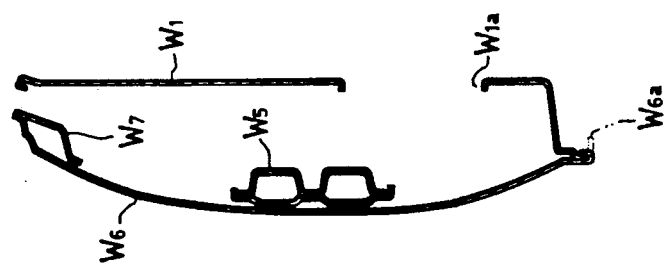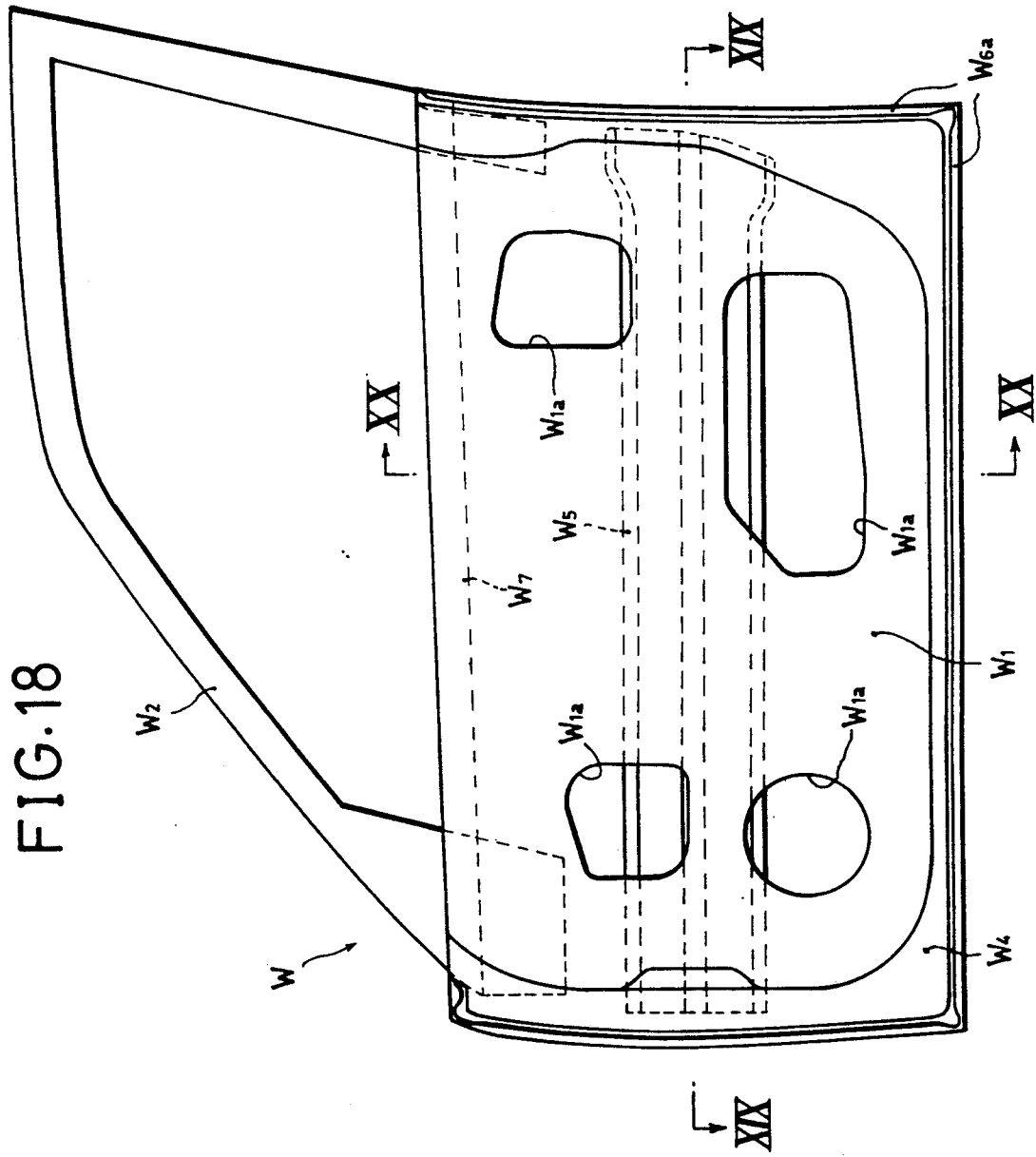

METHOD AND APPARATUS FOR MANUFACTURING MOTORCAR DOOR

BACKGROUND OF THE INVENTION

This invention relates to a method of manufacturing a door for a motorcar in which a door inner member is assembled by combining accessory parts such as a sash or the like to an inner panel, a beam is combined to the door inner member and then the door inner member is assembled to an outer panel, as well as to an apparatus to be used for carrying out the above method.

As an apparatus for manufacturing a door for a motorcar, there is conventionally known one which comprises, in the order from a starting end of the working line, a fitting station for a door inner member, a combining station for combining a beam and an assembling station for assembling the door inner member and an outer panel. In this apparatus, the door inner member is assembled by welding together an inner panel and accessory parts such as a sash, a hinge side member or the like which are set in position on a welding jig which is provided in the fitting station by welding guns which are provided in the welding jig. Then, the door inner member is transferred by a transfer apparatus to a welding jig which is provided in the beam combining station. The beam is set to this door inner member and is welded thereto by welding guns which are provided in the welding jig. Thereafter, the door inner member is transferred to a jig which is provided in the assembling station to assemble the outer panel to the door inner member. Then, hemming and welding of the hemmed portion are carried out (see Japanese Published Examined Patent Application No. 3467/1982).

In the above-described apparatus, each of the jigs are specially prepared for each type of door and, therefore, a plural kinds of jigs must be prepared to cope with the change in the type of door. In order to complete the assembling of the door inner member in the fitting station like in the above-described conventional apparatus, a large number of welding guns must be mounted on the welding jig to be provided in the fitting station. The costs for such many welding guns become expensive and therefore it is not advantageous from economical point of view to prepare so many expensive welding jigs.

If the number of welding guns to be mounted on the welding jig is reduced, only tack-welding of the door inner member is carried out in the fitting station and reinforcing-welding of the door inner member is carried out by welding robots in the next station, the overall costs of the equipment can be reduced because the exchanging of the welding robots is not necessary.

However, in such an arrangement, since a reinforcing welding station as the above-described next station is added between the fitting station and the beam combining station, the length of the working line becomes longer. Further, since the welding jig to be provided in the beam combining station becomes expensive, a drastic reduction in the equipment costs cannot be expected.

OBJECT AND SUMMARY OF THE INVENTION

In view of the above-described disadvantages, this invention has an object of providing a method and an apparatus for manufacturing a door for a motorcar in which the welding jig for the door inner member is made to be of a low cost with a reduced number of welding guns to be mounted thereon by carrying out the reinforcing welding of the door inner member by welding robots, and the welding jig for combining the beam is made needless, thereby aiming at the reduction of equipment costs, and in which the length of the working line needs not be increased.

In order to attain the above-described object, according to this invention method, there is provided a method of manufacturing a door for a motorcar in which a door inner member is assembled by combining accessory parts such as a sash to an inner panel, a beam is combined to the door inner member and thereafter the door inner member is assembled to an outer panel, characterized in: that an assembling step of the door inner member is divided into a tack-welding step for tack-welding the inner panel and the accessory parts on a welding jig and a reinforcing-welding step for reinforcing-welding the door inner member by welding robots; and that the beam is charged into a reinforcing-welding station for the reinforcing-welding step to weld it to the door inner member by the welding robots.

According to this invention apparatus, there is provided an apparatus for manufacturing a door for a motorcar comprising in a working line: a tack-welding station having disposed therein a welding jig for supporting and tack-welding an inner panel and accessory parts; a reinforcing-welding station having disposed therein welding robots; an assembling station having disposed therein an outer panel setting jig for supporting an outer panel, the tack-welding station through the assembling station being arranged in the order as described from a starting end of the working line. The apparatus further comprises: a first transfer apparatus which is provided with a transfer jig for holding a door inner member and transfers it by hanging from the tack-welding station to the reinforcing-welding station; a second transfer apparatus which is provided with a transfer jig for holding the door inner member and transfers it by hanging from the reinforcing-welding station to the assembling station to assemble the door inner member to the outer panel held on the outer panel setting jig; a beam charging apparatus which is reciprocated between the reinforcing-welding station and a beam setting station which is provided on a side of the reinforcing-welding station; and a beam setting jig which is mounted on the beam charging apparatus for holding a beam, such that the door inner member can be handed over among the beam setting jig and the transfer jig of each of the transfer apparatuses.

The door inner member which has been tack-welded by the welding jig in the tack-welding station is transported to the reinforcing-welding station by hanging with the transfer jig of the first transfer apparatus. Then, in the reinforcing-welding station, the door inner member is reinforcing-welded by the welding robots while it is held by the transfer jig of the first transfer apparatus. During this welding work, the beam charging apparatus is advanced from the beam setting station to the reinforcing-welding station. The door inner member, after welding, is handed over from the transfer jig to the beam setting jig of the beam setting apparatus. According to this operation, the beam on the setting jig is connected to the door inner member and, in this condition, the beam is welded to the door inner member with the welding robots.

After this welding has been finished, the door inner member is handed over from the beam setting jig to the transfer jig of the second transfer apparatus and is hung up for transporting by the second transfer apparatus from the reinforcing-welding station to the assembling station. There, the door inner member is assembled to the outer panel which is being held by the outer panel setting jig.

As described above, since the reinforcing-welding of the door inner member is carried out by the welding robots, the welding jig for assembling the door inner member may be of less expensive one only for carrying out the tack-welding. Further, since the combining of the beam to the door inner member is also carried out by the same welding robots, a welding jig for combining the beam is not required any more. In addition, the reinforcing-welding of the door inner member and the combining of the beam can be carried out in the same station. Therefore, the equipment costs can be reduced and the working line length needs not be increased.

Furthermore, the reinforcing-welding can be carried out while the door inner member is held by the first transfer apparatus, and the beam can be welded by handing over the door inner member to the beam charging apparatus. Therefore, no special jig needs be provided in the reinforcing-welding station. This brings about a further reduction of equipment costs.

Each of the above-described jigs is specially prepared for each type of door and, therefore, the jig must be exchanged or replaced every time the type of the door is changed. Therefore, it can be considered to provide a jig stocking apparatus respectively on a side of the tack-welding station and on a side of the assembling station in order to replace the welding jig o the outer panel setting jig by exchanging the jigs between each of the above-described stations and each of the stocking apparatuses, respectively. In this case, by employing the following arrangement, each of the transfer jigs can be replaced without the operator's entering the working line, resulting in an easier exchanging work. Namely, the arrangement is that there are provided means for docking or connecting the transfer jig of the first transfer apparatus with the the welding jig and means for docking or connecting the transfer jig of the second transfer apparatus with the outer panel setting jig so that the welding jig and the outer panel setting jig may be exchanged in a condition in which each of the transfer jigs is docked with each of the jigs.

For the purpose of exchanging the beam setting jig of the beam charging apparatus, it is also considered to provide, on a side of the beam setting station, a stocking place for stocking a plurality of beam setting jigs depending on the type of the door so that the jig may be exchanged by moving the beam charging apparatus to the stocking place. In this arrangement, however, a space exclusively for stocking the beam setting jigs must be secured. This brings about a poorer space efficiency as well as a need to move the beam charging apparatus beyond the normal travelling area whenever the jig is exchanged, resulting in more time in exchanging the jig. If, on the the contrary, a plurality of stocking means are provided in a line along a path of travel of the beam charging apparatus between the reinforcing-welding station and the beam setting station, the stocking means being arranged to detachably hold the beam setting jig for handing it over to and from the beam charging apparatus, the space above the travel path of the normal travelling area of the beam charging apparatus can be utilized as a stocking space for the beam setting jig. This brings about an increased space efficiency and enables to efficiently and automatically exchange the jig within the normal travelling area.

It is necessary to combine a stiffener to the outer panel in advance. It is desired to closely lay out the door manufacturing step inclusive of the stiffener assembling step in order to attain an improved space efficiency. Therefore, according to another feature of this invention, there are provided an outer panel setting station on a side of the assembling station, a stiffener combining station between the assembling station and the outer panel setting station to set and combine a stiffener to the outer panel, and transfer means to transfer the outer panel from the outer panel setting station to the assembling station through the stiffener combining station.

When the stiffener is assembled to the outer panel, if the stiffener is welded to the outer panel by directly pinching the welding portion of the outer panel with a welding gun, there will remain pinching marks o the external surface of the outer panel. Therefore, it is conventionally practiced to provided a backing bar for welding provided with pads which abut that external surface of the outer panel at which the stiffener is attached. Welding of the stiffener attaching portion is thus carried out by pinching, with the welding gun, the portion at which the stiffener is attached, via the pads of the backing bar. The backing bar is specially prepared for each type of door, and it is necessary to exchange the backing bar whenever the type of the door is changed. As an exchanging apparatus, there is known one, in the Japanese Published Examined Utility Model Registration Application No. 27989/1990, in which a rotary shaft capable of index-rotating is provided on an apparatus frame, a plurality of backing bars are mounted on the periphery of the shaft, and an arbitrary one of the backing bars can be selected to a predetermined operating position by the rotation of the shaft. In this arrangement, however, it is necessary to mount the backing bars in the periphery of the rotary shaft at a required pitch angle in order to prevent the interference of the welding gun with the neighboring backing bars. It is therefore not possible to mount many backing bars on the rotary shaft.

On the contrary, if there is provided in the stiffener combining station an exchanging apparatus comprising a pair of circularly driven chains parallelly disposed at a distance from each other in a longitudinal direction of the backing bars such that a plurality of the backing bars are laterally mounted across the chains at a distance between each of the backing bars in a direction of circulation so that an arbitrary one of the backing bars can be selected in a predetermined operating position by the circulating drive of the chains, the shape of the circulating path of the chains can be freely determined by the arrangement of sprockets. Therefore, even if the pitch at which the backing bars are arranged is made relatively smaller, the interference between the welding gun and the backing bars can be prevented by setting the circulating path away from the operating area of the welding gun. Accordingly, it becomes possible to carry out the exchanging of many backing bars with a relatively small apparatus.

In order to securely hold the backing bar that has been selected at the operating position, it is preferable to provide a locking means to engage with the backing bar. When welding is carried out with the backing bar which has been locked in the operating position, it frequently occurs that sputtered particles are spread over the backing bars at positions other than the operating position. In order to prevent the spreading of these sputtered particles, it is preferable to provide between the chains a sputter cover to protect the backing bars from the sputtered particles. In this case, the sputter cover is made to be folded inwardly inside the travel path of the backing bars. In this arrangement, the chains are driven in a condition in which the sputter cover is folded, thus preventing the sputter cover from interfering with the backing bars.

In addition, in order to automate the work of setting the stiffener to the outer panel, it is preferable to provide a stiffener feeding apparatus on a side of the stiffener combining station, a setting robot which is reciprocated between the feeding apparatus and the stiffener combining station, and a tool which is mounted on the setting robot for holding the stiffener such that the stiffener to be supplied by the feeding apparatus can be transported by the robot to the stiffener combining station for setting it to the outer panel. Here, since the tool is specially prepared for each type of door, it becomes necessary to exchange the tool whenever the type of door is changed. In this case, if there are provided, in a line along a travel path of the setting robot, a plurality of stocking means each of which detachably holds the tool for handing over the tool to and from the setting robot, it is possible, like in the case of the exchanging of the above-described beam setting jig, to improve the space efficiency and to attain an increased efficiency in the exchanging work.

BRIEF DESCRIPTION OF THE DRAWINGS

The above and other objects and the attendant advantages of this invention will become readily apparent by reference to the following detailed description when considered in conjunction with the accompanying drawings wherein:

FIG. 10 is a front view of a stiffener combining station viewed from the line X—X in FIG. 1;

FIG. 11 is a side view of a stiffener setting robot viewed from the line XI—XI in FIG. 10;

Figure 14:
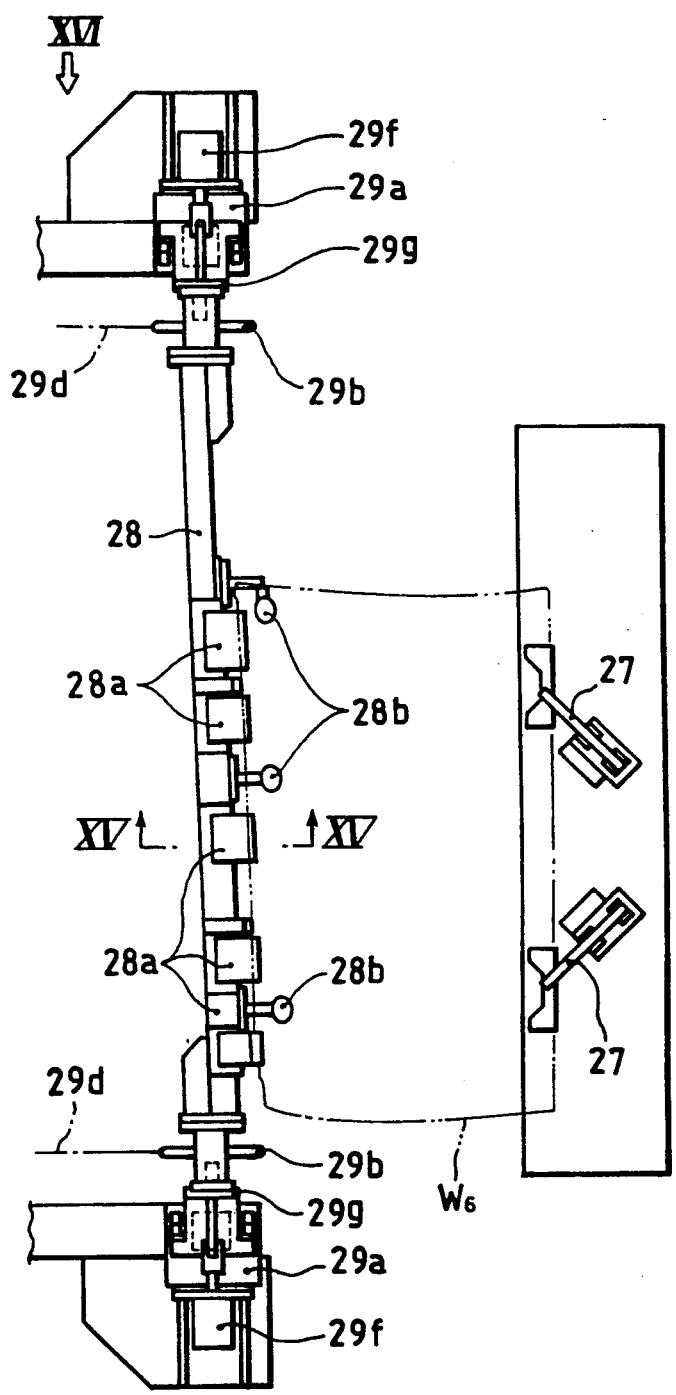
Figure 15:
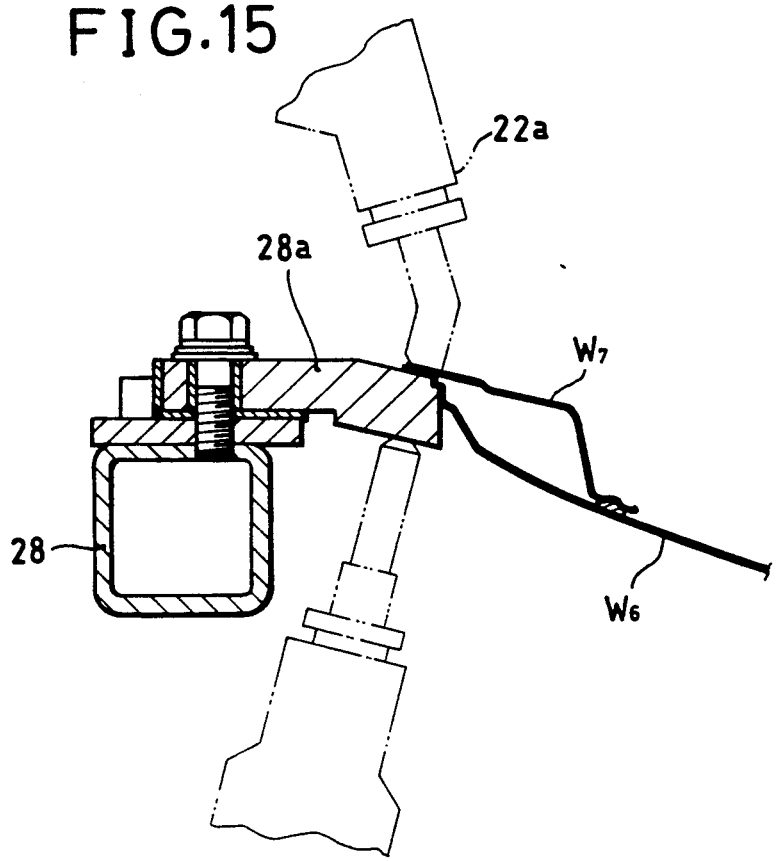
Figure 19:
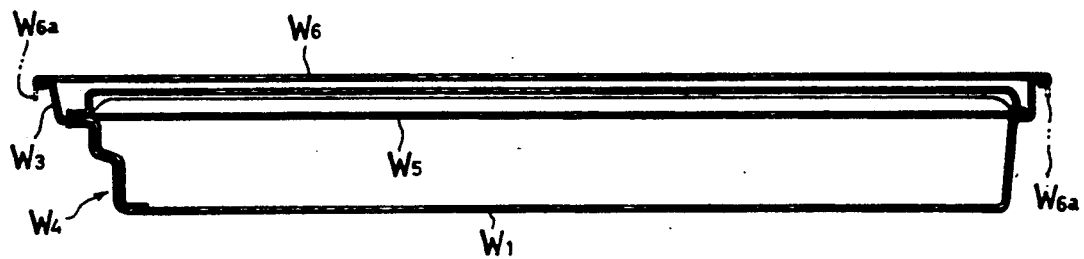
Figure 17:
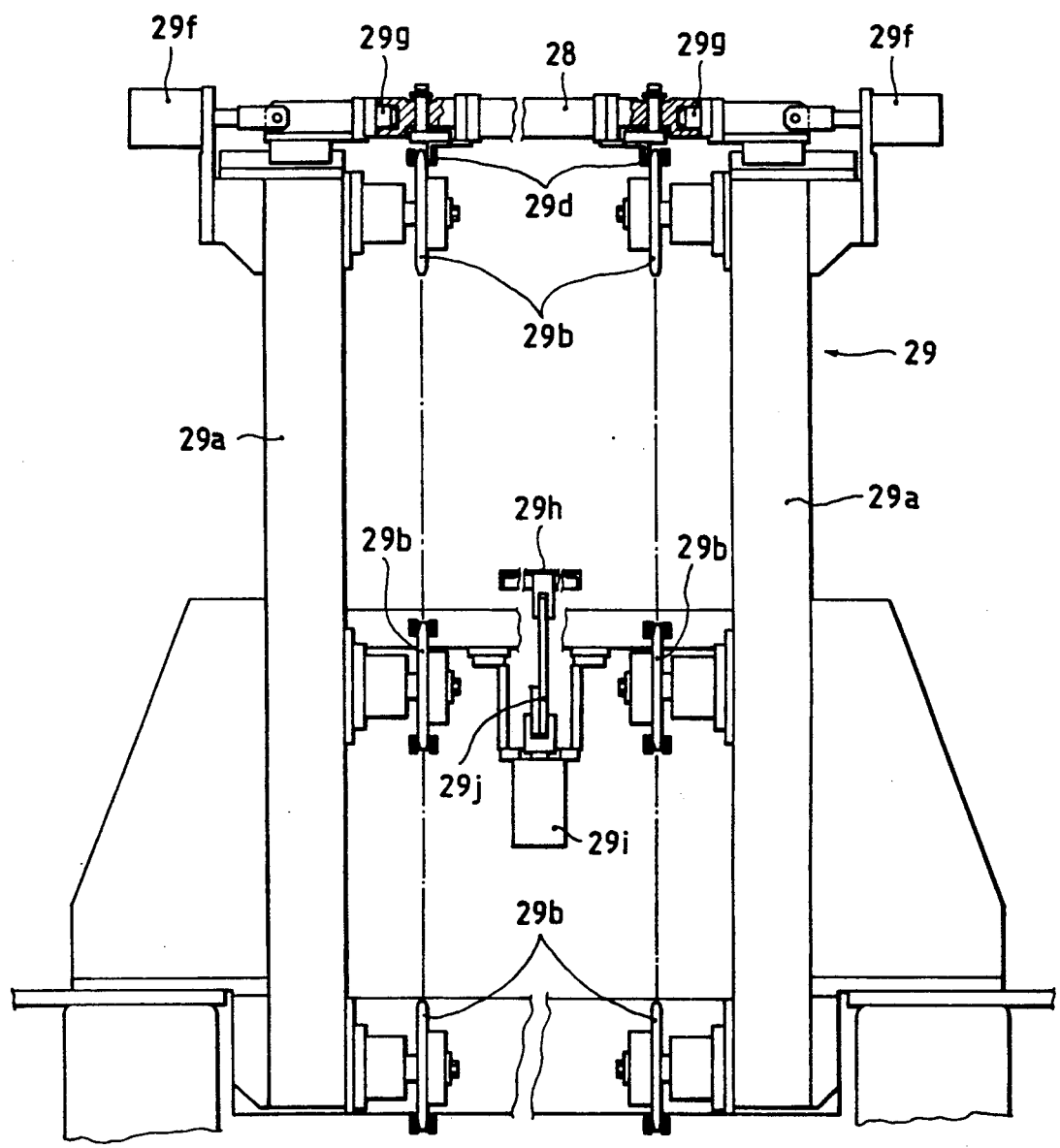

Fi9. 13 is an enlarged front view of a stocking apparatus for stiffener holding tools viewed from the direction of an arrow XIII in Fi9. 11;

FIG. 14 is an enlarged plan view of a stiffener assembling station viewed from the direction of an arrow XIV—XIV in FIG. 10;

FIG. 15 is a sectional view taken along the line XV—XV in FIG. 14;

FIG. 16 is a side view of a backing bar exchanging apparatus viewed from the direction of an arrow XVI in FIG. 14;

FIG. 17 is a front view viewed from the left side in FIG. 16;

FIG. 18 is a side view of a door viewed from the side of an inner member thereof; and FIGS. 19 and 20 are sectional views taken along the lines XIX—XIX and XX—XX, respectively, in FIG. 18.

DETAILED DESCRIPTION OF THE INVENTION

An illustrated embodying example is for manufacturing a motorcar door W as shown in FIG. 18. The door W is manufactured in the following manner. Namely, a beam $W_5$ is combined to a door inner member $W_4$ which is constituted by combining, as shown in FIG. 19, a sash $W_2$ and a hinge side member $W_3$ to an inner panel $W_1$ having formed therein a plurality of window openings $W_{1a}$ for maintenance purpose or the like. The door inner member $W_4$ is then assembled to an outer panel $W_6$ and the periphery of the outer panel $W_6$ is hemmed as shown in FIGS. 19 and 20. This hemmed portion is then welded, thus completing the manufacturing of the motorcar door W. A stiffener $W_7$ is welded to an upper inner surface of the outer panel $W_6$.

Figure 1:
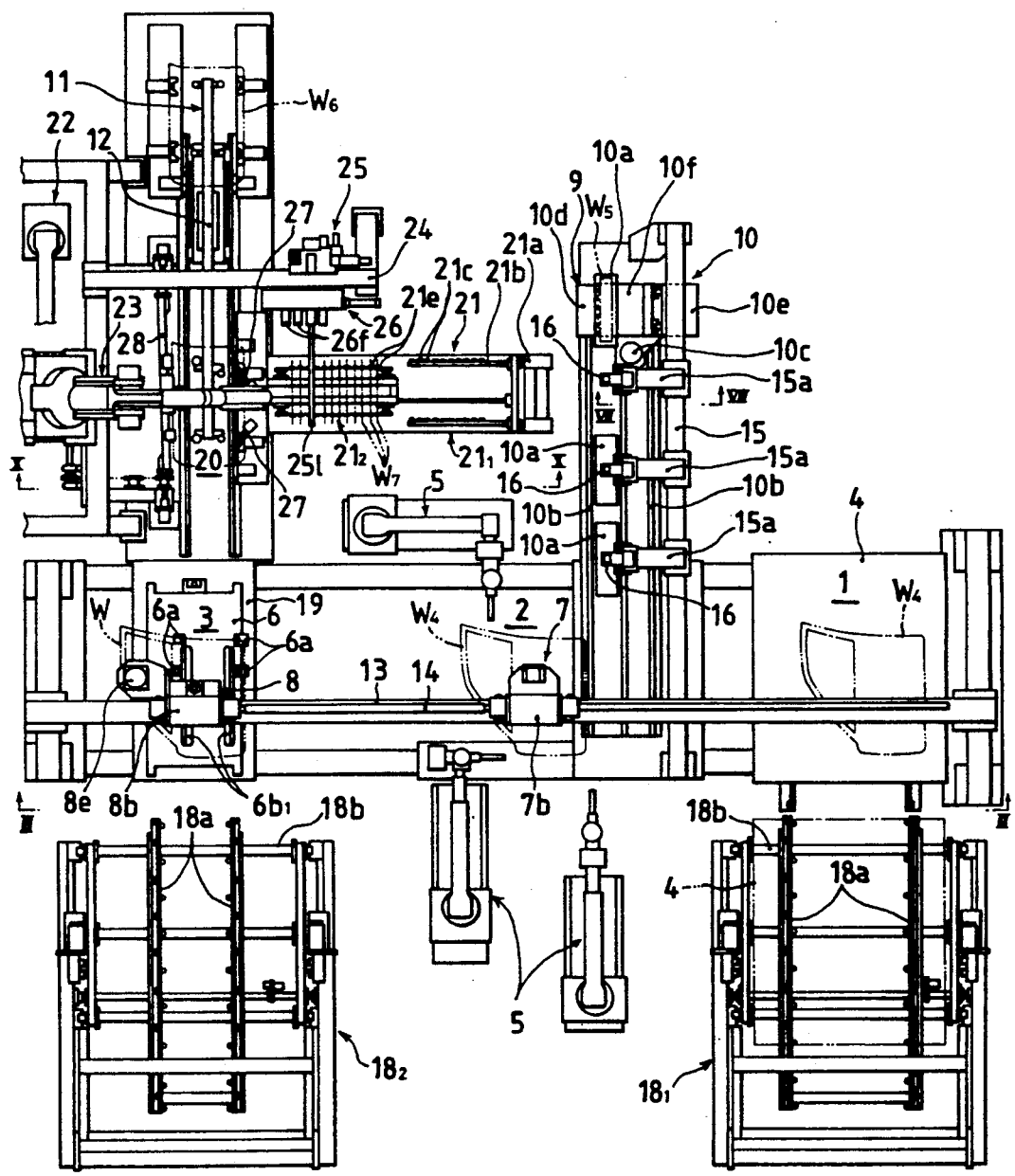
FIG. 1 is a plan view of an example of this invention apparatus.
Figure 2:
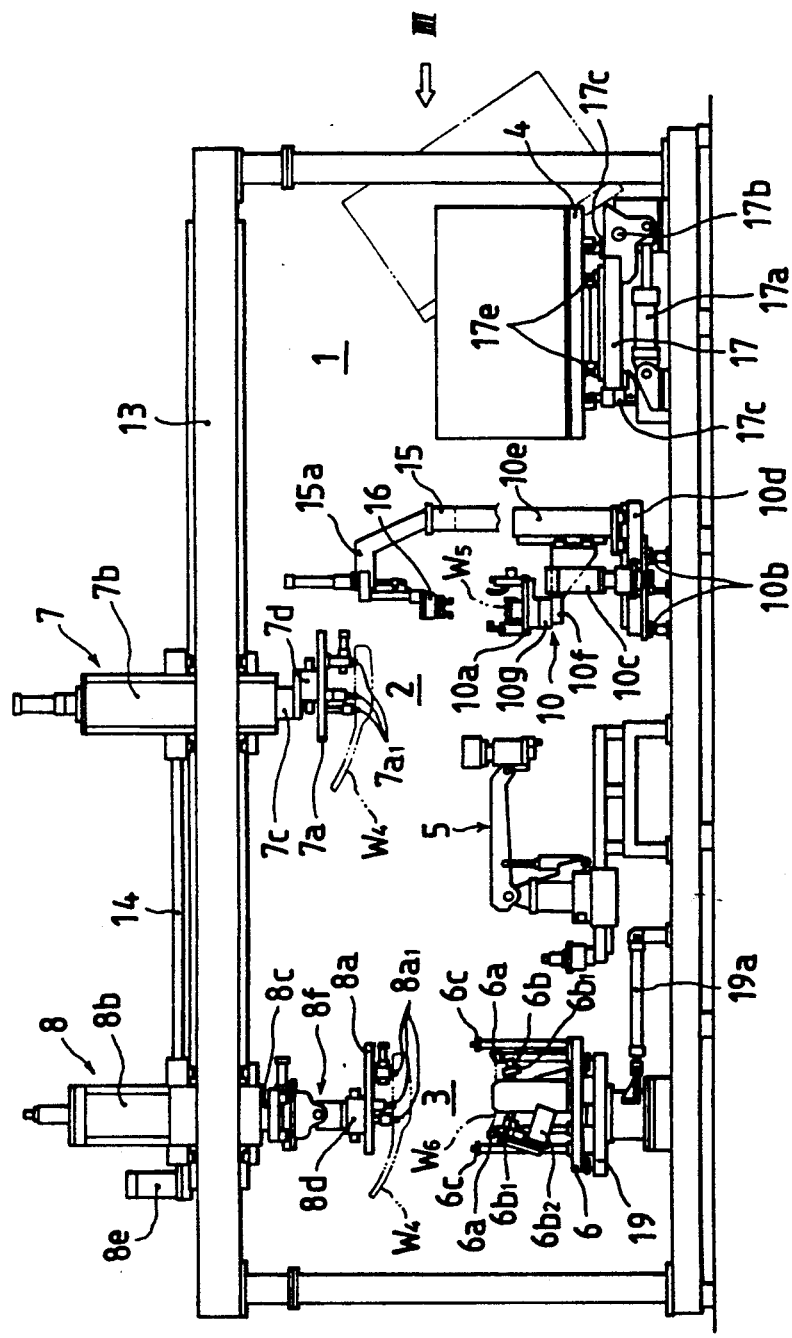
FIG. 2 is a side view viewed from the line II—II in FIG. 1.

Referring to FIGS. 1 and 2, numeral 1 denotes a tack-welding station which is provided at a starting end of a working line. In front of this tack-welding station 1, there are provided a reinforcing-welding station 2 and, still in front thereof, an assembling station 3. A welding jig 4 is provided in the tack-welding station 1, a plurality of welding robots 5 are provided in the reinforcing welding station 2 and an outer panel setting jig 6 is provided in the assembling station 3. In the working line, there are provided a suspended type of first transfer apparatus 7 which can be reciprocated between the tack-welding station 1 and the reinforcing-welding station 2, as well as a suspended type of second transfer apparatus 8 which can be reciprocated between the reinforcing-welding station 2 and the assembling station 3. There are further provided a beam charging apparatus 10 which can be reciprocated between the reinforcing-welding station 2 and a beam setting station 9 which is provided on a side of the reinforcing welding station 2, as well as a transfer apparatus 12 which can be reciprocated between the assembling station 3 and an outer panel setting station 11 which is provided on a side of the assembling station 3. In the tack-welding station 1, the inner panel $W_1$, the sash $W_2$ and the hinge side member $W_3$ are set in position to the welding jig 4 and are tack-welded on the welding jig 4 to assemble the door inner member $W_4$. The door inner member $W_4$ is transported to the reinforcing-welding station 2 by making it held by a transfer jig 7a which is provided in the first transfer apparatus 7. After the door inner member $W_4$ is subjected to reinforcing-welding in the reinforcing-welding station 2 by the welding robots 5, the beam $W_5$ to be charged into the reinforcing-welding station 2 by being held by a beam setting jig 10a which is provided in the beam charging apparatus 10, is welded by the welding robots 5 to the door inner member $W_4$. Thereafter, the door inner member $W_4$ is transported to the assembling station 3 by making it held by a transfer jig 8a which is provided in the second transfer apparatus 8. The door inner member $W_4$ is assembled to the outer panel $W_6$ which is transported and set in position to the outer panel setting jig 6 by the transfer apparatus 12.

Each of the first and the second transfer apparatuses 7, 8 comprises: a travelling frame 7b, 8b which is movable back and forth along a common guide frame 13 which is provided in a ceiling portion of the working line; a lifting frame 7c, 8c which is supported on the travelling frame 7b, 8b and is movable up and down; and the above-described transfer jig 7a, 8a which is detachably suspended from the lifting frame 7c, 8c via a tool holder 7d, 8d. The travelling frames 7b, 8b of the transfer apparatuses 7, 8 are connected to each other by a connecting bar 14. In this manner, it is so arranged that, when the travelling frame 8b is reciprocated by a travelling electric motor 8e mounted on the travelling frame 8b of the second transfer apparatus 8 between the assembling station 3 and the reinforcing welding station 2, the travelling frame 7b of the first transfer apparatus 7 can be reciprocated between the reinforcing welding station 2 and the tack-welding station 1. At a lower end of the lifting frame 8c of the second transfer apparatus 8, there is provided a wrist member 8f which has a freedom of two-axis movements in the forward and backward movement and the forward and backward swinging. The transfer jig 8a is suspended from the wrist member 8f via the tool holder 8d. Through the movements of the wrist member 8f, the posture of the door inner member W$_4$ is controlled so that it can be set to the outer panel W$_6$ without its interfering with bent edges W$_{6a}$ for hemming of the outer panel W$_6$. Each of the transfer jigs 7a, 8a is provided with a plurality of holding devices 7a1, 8a1 for holding the door inner member W$_4$ at opening edge portions or the like of the window openings W$_{1a}$ of the inner panel W$_1$.

Figure 4:
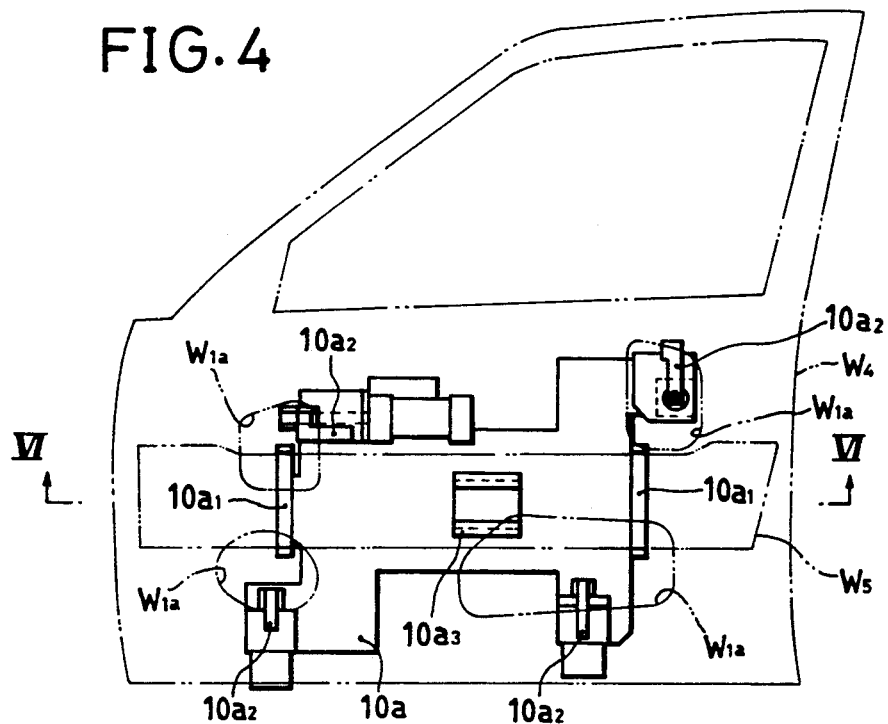
FIG. 4 is a plan view of a beam setting jig.
Figure 5:
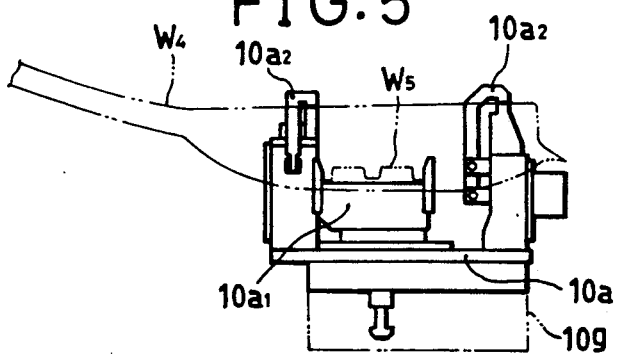
FIG. 5 is a left side view thereof.
Figure 6:
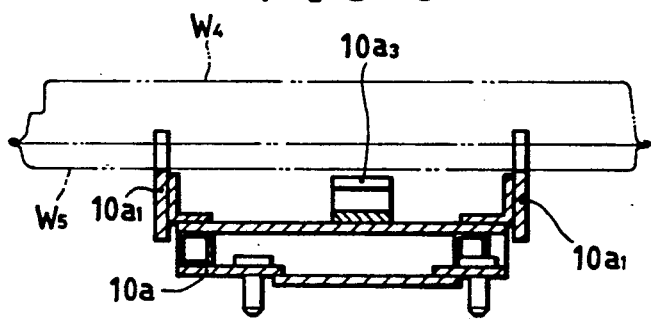
FIG. 6 is a sectional view taken along the line VI—VI in FIG. 4.

The beam charging apparatus 10 comprises: a travelling base 10d which is reciprocated between the reinforcing welding station 2 and the beam setting station 9 by an electric motor 10c along guide rails 10b which are laid between the two stations 2, 9; a slide base 10e which is mounted on the travelling base 10d and is movable at right angles to the travelling direction of the travelling base 10d, i.e., in the forward-backward direction; a lifting table 10f which is supported on the slide base 10e; and the above-described beam setting jig 10a which is detachably mounted on the lifting table 10f via a tool holder 10g. The jig 10a is provided, as shown in FIGS. 4 through 6, with a pair of workpiece receiving members 10$_{a1}$ for supporting the beam W$_5$ and a plurality of clamping devices 10$_{a2}$ for positioning and supporting the door inner member W$_4$ by clamping the inner panel W$_1$ at opening edges of the opening windows W$_{1a}$. In the setting station 9 the beam W$_5$ is set in position to the workpiece receiving members 10$_{a1}$ on the beam setting jig 10a, and the travelling base 10d is advanced to the reinforcing-welding station 2. Thereafter, the slide base 10e is moved forwards, the lifting table 10f is lifted and the transfer jig 7a of the first transfer apparatus 7 is lowered to hand over the reinforcing-welded door inner member W$_4$ which is held by the transfer jig 7a to the beam setting jig 10a. While the door inner member W$_4$ is thus supported after aligning by the clamping devices 10$_{a2}$, the beam W$_5$ which is supported by the workpiece receiving member 10$_{a1}$ is connected to a predetermined position of the door inner member W$_4$. In this condition, the beam W$_5$ is welded to the door inner member W$_4$ by the welding robots 5.

Figure 7:
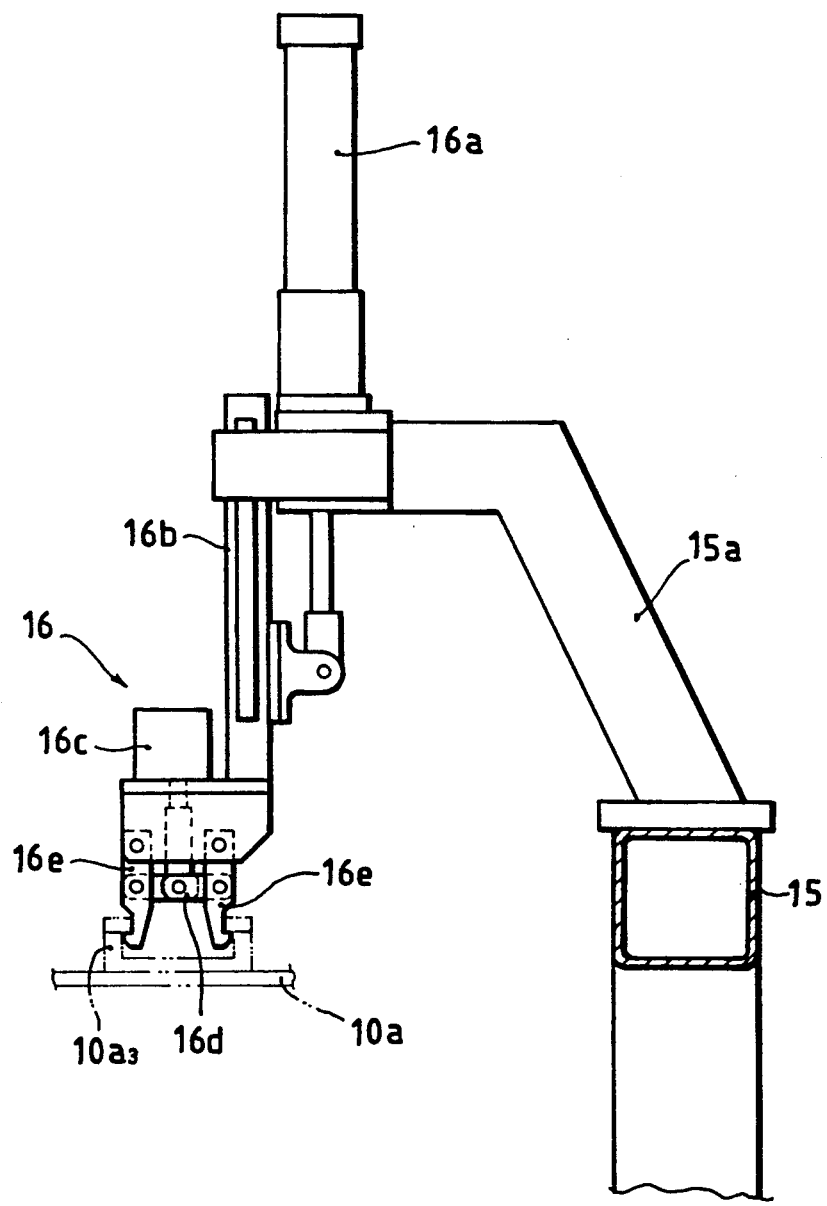
FIG. 7 is an enlarged side view of a stocking apparatus for a beam setting jig viewed from the line VII—VII in FIG. 1.

The beam setting jig 10a must be changed depending on the type of door. Therefore, a plurality of stockers 16 for the setting jigs 10a are provided on an apparatus frame 15 which is extended over the travel path of the beam charging apparatus 10. As shown in FIG. 7, the stocker 16 comprises a lifting bar 16b which is suspended from a bracket 15a on the apparatus frame 15 and is movable up and down by a cylinder 16a, and a pair of claw pieces 16e which are provided at a lower end of the lifting bar 16b and are opened and closed by a cylinder 16c via a toggle link 16d. The claw pieces 16e are engaged with a hook 10$_{a3}$ which is fixedly provided on an upper central portion of the setting jig 10a so that the setting jig 10a may be detachably suspended. When the jig is to be exchanged, the beam charging apparatus 10 is moved to a position right below an empty stocker 16 to let the stocker receive the setting jig 10a which has finished its operation. Then, the beam charging apparatus 10 is moved to a position right below a particular stocker 16 which is suspending a setting jig 10a to be used next, thus handing over the setting jig 10a to the beam charging apparatus 10.

Figure 8:
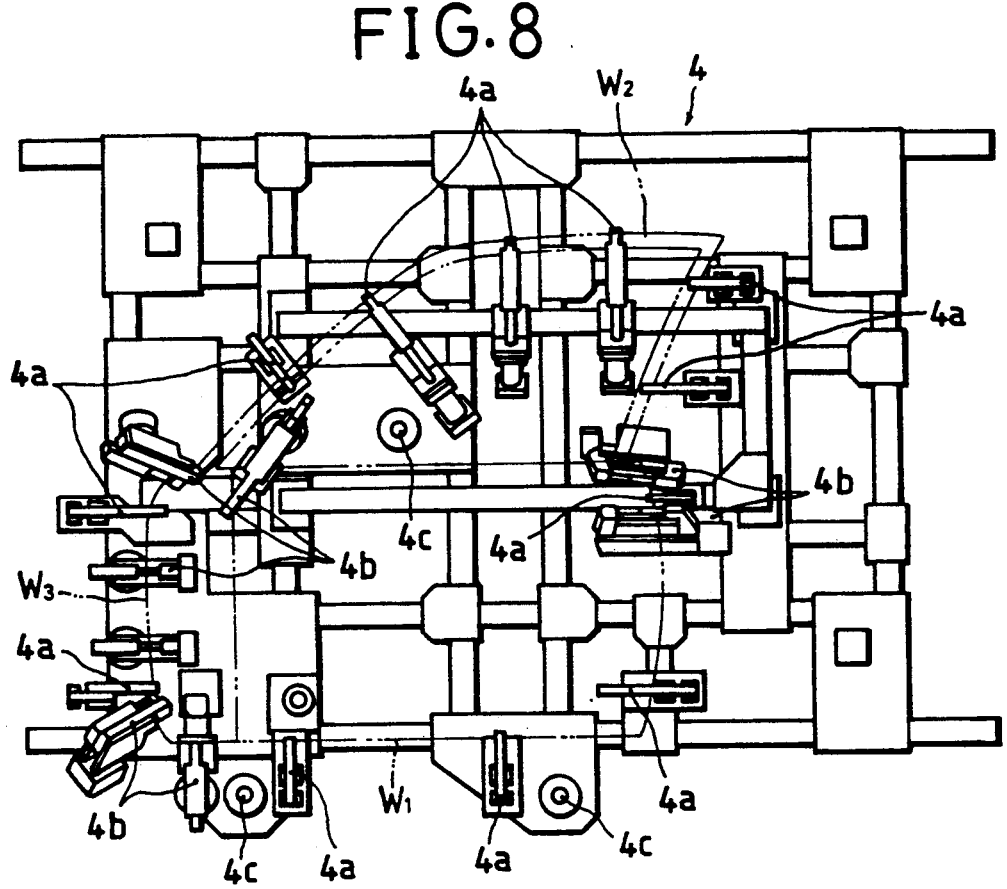
FIG. 8 is a plan view of a welding jig.
Figure 9:
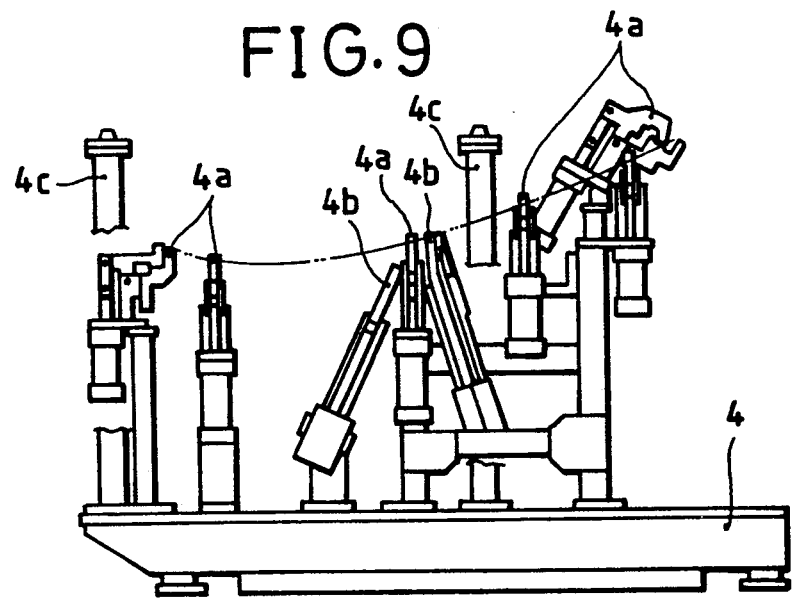
FIG. 9 is a right side view of FIG. 8.

The welding jig 4 comprises, as shown in FIGS. 8 and 9: a plurality of clamping pieces 4a for positioning and clamping the inner panel W$_1$, the sash W$_2$ and the hinge side member W$_3$; and a plurality of welding guns 4b for welding at minimum required points the overlapped portions of the sash W$_2$ and the hinge side member W$_3$, respectively, against the inner panel W$_1$ in order to prevent them from becoming separated from each other. As shown in FIG. 2, the welding jig 4 is mounted on a jig base 17 which is erected and laid down by a cylinder 17a about an axis 17b at a rear end of the jig base 17. While the jig base 17 is erected backwards by the movement of the jig base 17, the workpieces such as the inner panel W$_1$ or the like are set in position to the welding jig 4 in this condition from the rear end.

Figure 3:
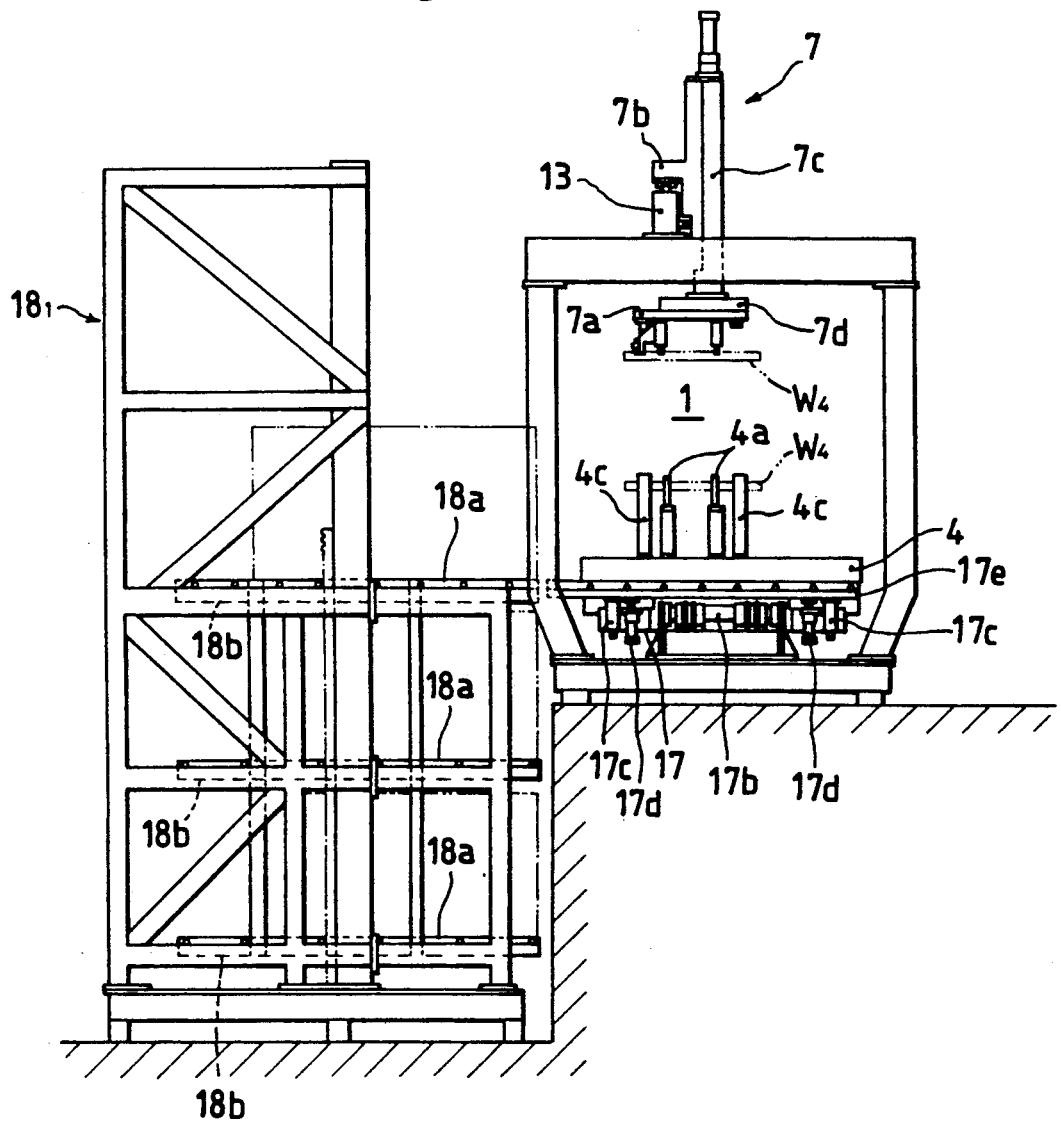
FIG. 3 is a front view of a tack-welding station viewed from the direction of an arrow III in FIG. 2.

On a side of the tack-welding station 1, there is provided, as shown in FIGS. 1 and 3, a jig stocking apparatus 18$_1$ comprising stock bases 18b which have rails 18a for supporting the welding jig 4 and are arranged in a plurality of vertical stages so as to be movable up and down. On the jig base 17, there are provided locking cylinders 17c for locking the welding jig 4, and rails 17e which are movable up and down by cylinders 17d. By lifting the rails 17e in a condition in which the locking by the locking cylinders 17c is released, the welding jig 4 is supported on the rails 17e and the welding jig 4 is thus made to be exchangeable between the stock base 18b and the jig base 17. On the welding jig 4 there is vertically provided a plurality of poles 4c which can be docked or connected with the transfer jig 7a of the first transfer apparatus 7. Both jigs 4 and 7a are thus made to be exchangeable in one set by docking the transfer jig 7a with the welding jig 4 at the poles 4c.

The above-described outer panel setting jig 6 is provided with a plurality of supporting devices 6a for supporting the outer panel W$_6$ and a conveyor 6b which has a pair of belts 6$_{b1}$ and is movable up and down. The setting jig 6 is mounted on a jig base 19 which is rotatable by a cylinder 19a provided in the assembling station 3 so that the setting jig 6 can be converted between a laterally oriented posture and a longitudinally oriented posture through the rotation of the jig base 19 at 90 degrees in one and the reverse directions. In a condition in which the setting jig 6 is in the laterally oriented posture, the outer panel W$_6$ is set in position to the supporting devices 6a via the transfer apparatus 12. In this condition, the door inner member W$_4$ is assembled to the outer panel W$_6$ as described above by the second transfer apparatus 8. Then, the setting jig 6 is changed to the longitudinally oriented posture and the conveyor $6b$ is lifted to support the door W on the belts $6_{b1}$. The door W is then discharged by driving the belts $6_{b1}$ by a conveyor motor $6_{b2}$ to the next step in which hemming is carried out.

A jig stocking apparatus $18_2$, which is similar to the one described above, is provided also on a side of the assembling station 3. A plurality of poles 6c which can be docked or connected with the transfer jig 8a of the second transfer apparatus 8 are vertically provided on the setting jig 6. In a condition in which the transfer jig 8a is docked with the setting jig 6, the setting jig 6 cna be exchanged between the jig base 19 and the stocking base 18b of the stocking apparatus $18_2$.

In an intermediate position between the assembling station 3 and the outer panel setting station 11 which is located on a side of the assembling station 3, there is provided a stiffener combining station 20. The transfer apparatus 12 is so arranged that the outer panel $W_6$ is intermittently sent from the setting station 11 to the assembling station 3 through the combining station 20 so that the stiffener $W_7$ can be welded to the outer panel $W_6$ at the combining station 20.

More detailed explanations are made referring to FIGS. 1 and 10. A stiffener feeding apparatus 21 is provided on one side of the combining station 20 and there are provided a welding robot 22 on the other side thereof and a sealing robot 23 on an upper portion of the other side thereof. A setting robot 25 is mounted on an apparatus frame 24 which is laterally provided in a space above the travel path of the transfer apparatus 12. The stiffener $W_7$ is picked up from the feeding apparatus 21 one at a time by the setting robot 25. After a sealing agent is applied to the stiffener $W_7$ by the sealing robot 23, the stiffener $W_7$ is set to the outer panel $W_6$ by the setting robot 25. In this condition, the stiffener $W_7$ is welded by the welding robot 22 to the outer panel $W_6$.

The stiffener feeding apparatus 21 comprises: a transfer unit $21_1$ which is made up by arranging a plurality of holding devices 21c for the stiffeners $W_7$ at an equal pitch on a lifting frame 21b supported on a movable frame 21a which is movable back and forth, and a feeding unit $21_2$ which is made up by attaching holding devices 21e, at a predetermined pitch, to chains 21d which are driven in a circulating manner. In a condition in which the stiffeners $W_7$ are inserted into the holding devices 21c of the transfer unit $21_1$, the movable frame 21a is advanced and then the lifting frame 21b is lowered. The stiffeners $W_7$ are thus handed over to the holding devices $21_e$ of the feeding unit $21_2$. Then, by advancing the holding devices 21e by one pitch at a time through the intermittent operation of the chains 21d, the stiffeners $W_7$ are picked up by the setting robot 25 at a predetermined position.

Figure 12:
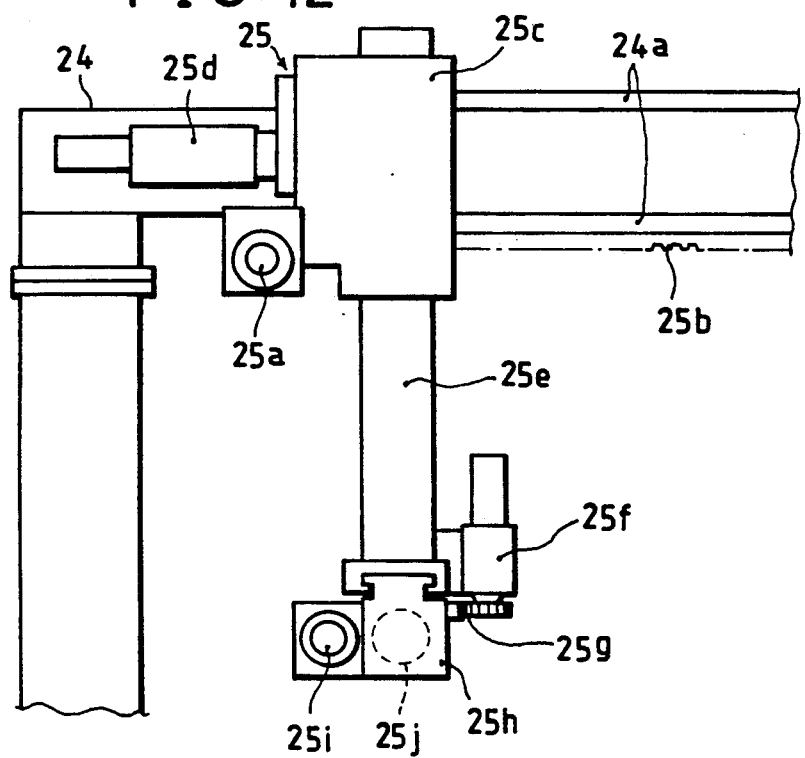
FIG. 12 is a rear view of the stiffener setting robot viewed from the direction of an arrow XII in FIG. 11.

The setting robot 25 comprises, as shown in FIGS. 11 and 12: a travelling frame 25c which is reciprocated between a receiving position on the side of the feeding apparatus 21 and a setting position on the side of the stiffener combining station 20 via a rack-and-pinion mechanism 25b by an electric motor 25a along rails 24a on the apparatus frame 24; and a lifting frame 25e which is provided on the travelling frame 25c and is movable up and down via an internal rack-and-pinion mechanism by an electric motor 25d. At a lower end of the lifting frame 25e, there is provided a movable frame 25h which is movable back and forth in a direction at right angles to the direction of travel of the travelling frame 25c (i.e., the longitudinal direction of the stiffener). On the movable frame 25h, there is rotatably supported a chuck unit 25j which is rotated by an electric motor 25i via internal gear wheels. The chuck unit 25j detachably holds a bar-shaped tool 251 which extends in the longitudinal direction of the stiffener $W_7$ by means of a connecting pin 25m at a rear end of the tool 251. The tool 251 is provided with a plurality of clamping devices 25k for holding the stiffener $W_7$. When the setting robot 25 is retreated to the receiving position, the stiffener $W_7$ is picked up from the feeding apparatus 21 by being clamped by the tool 251. Then, the setting robot 25 is advanced to the setting position. At the same time, the tool 251 is rotated via the chuck unit 25j about its axial line to control the posture of the stiffener $W_7$, and the sealing agent is applied thereto by the sealing robot 23. Then, through the rotation of the tool 251, the stiffener $W_7$ is made to a predetermined set posture to set it to the outer panel $W_6$. The tool 251 is specially prepared for each type of door. For the exchanging of the tool 251, there is provided on the apparatus frame 24 a stocking apparatus 26 which holds a plurality of tools 251.

Figure 13:
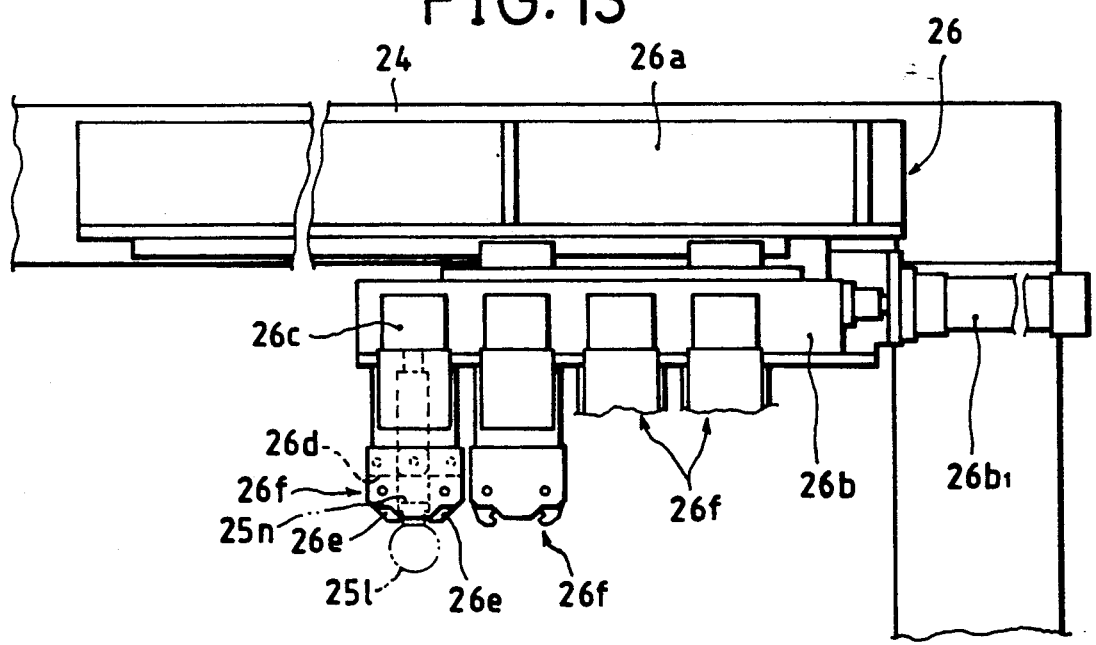

The stocking apparatus 26 comprises, as shown in FIG. 13: a bracket 26a which is fixedly provided on a front surface of the apparatus frame 24; a slide frame 26b which is mounted on the bracket 26a and is movable sideways by a cylinder $26_{b1}$ to advance and retreat; and a plurality of stockers 26f arranged in a line along the travel path of the setting robot 25, each stoker having a pair of claw pieces 26e which can be opened and closed by a cylinder 26c via a toggle link 26d to hold a T-shaped projection 25n which is provided on an upper surface of the rear end of the tool 251. In a condition in which the setting robot 25 is moved to a position corresponding to a predetermined stocker 26f, the movable frame 25h of the robot 25 is advanced so that the projection 25n of the tool 251 is positioned right under the stocker 26f. Then, through the movement of the lifting frame 25e, the tool 251 is lifted and the projection 25n is inserted into a space between the pair of claw pieces 26e of the stocker 26f. After the claw pieces 26e are closed in this condition to hold the projection 25n, the chucking of the chuck unit 25j is released and the movable frame 26b is retreated. The connecting pin 25m at the rear end of the tool 251 is detached from the chuck unit 25j and the tool 251 is handed over to the stocker 26f. The tool 251 is handed over from the stocker 25f to the setting robot 25 by the operations that are opposite to those described above.

Even if the setting robot 25 is moved to a retreated position which corresponds to the receiving position, the tool 251 does not move up to a position right below those stockers 26f that are positioned rather at an end portion of the apparatus frame 24. When the tool 251 is to be handed over to one of those stockers 26f that are positioned rather at the end portion, the sliding frame 26b is moved so that the stocker 26f is positioned right above the tool 251.

Referring to FIGS. 1 and 10, the stiffener combining station 20 is provided, on one side of the transfer apparatus 12, with holding devices 27 for holding that edge portion of the outer panel $W_6$ which is opposite to the edge to which the stiffener $W_7$ is welded and, on the other side of the transfer apparatus 12, with a backing bar 28 for supporting the edge to which the stiffener $W_7$ is welded. The backing bar 28 is provided, as shown in FIG. 14, with a plurality of pads 28a which abut, at each of the welding positions, that external edge of the outer panel $W_6$ to which the stiffener $W_7$ is welded, as well as suction devices 28b. As shown in FIG. 15, the stiffener W₇ and the pad 28a are pinched by a welding gun 22a which is mounted on the welding robot 22 and then charged with an electric current. It is thus so arranged that the stiffener W₇ can be welded to the outer panel W₆ without leaving spot marks on the outer panel W₆.

Specially designed backing bars 28 are also prepared for each type of door model. An exchanging apparatus 29 is therefore provided for automatically exchanging the backing bars 28 at the time of change in the door type.

The exchanging apparatus 29 comprises, as shown in FIGS. 16 and 17: a pair of supporting frames 29a, 29a which are vertically provided at a distance from each other in a longitudinal direction of the backing bar 28; and sprockets 29b which are rotatably supported on the supporting frames 29a, 29a in three vertical stages on each side; and rotatably supported driving sprockets 29c at a lower rear portion. Backing bars 28 are laterally disposed on a pair of chains 29d which are extended over these sprockets 29b, 29c, in the direction of circulation of the chains 29d at a distance between each of the backing bars 28. The driving sprockets 29c are driven by electric motors 29e so that an arbitrary one of the backing bars 28 can be selected to be positioned at an upper operating position. The backing bars 28 are thus made to be exchangeable depending on the type of the door. The backing bar 28 that has been selected to be positioned in the operating position is locked by locking members 29g which are provided at an upper end of each supporting frames 29a and are advanced or retreated by cylinders 29f. A sputter cover 29h is provided in a space between the supporting frames 29a to prevent the sputtered particles from spreading over that backing bars 28 which are positioned other than at the operating position. The cover 29h is constructed so as to be folded upwards by a cylinder 29i via a link 29j to prevent its interfering with the backing bar 28 at the time of its exchanging.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for manufacturing a door for a motorcar in which a door inner member is assembled by combining accessory parts a beam is combined to the door inner member and thereafter the door inner member is assembled to an outer panel, said apparatus comprising in a working line:
    a tack-welding station having disposed therein a welding jig for supporting and tack-welding the inner panel and the accessory parts;
    a reinforcing-welding station having disposed therein welding robots;
    an assembling station having disposed therein an outer panel setting jig for supporting the outer panel, said tack-welding station through said assembling station being arranged in the order as described from a starting end of said working line;
    a first transfer apparatus which is provided with a transfer jig for holding the door inner member and which transfers said inner member by hanging from said tack-welding station to said reinforcing-welding station;
    a second transfer apparatus which is provided with a transfer jig for holding the door inner member and which transfers said inner member by hanging from said reinforcing-welding station to said assembling station to assemble the door inner member to the outer panel held on said outer panel setting jig;
    a beam charging apparatus which is reciprocated between said reinforcing-welding station and a beam setting station which is provided on a side of said reinforcing-welding station; and
    a beam setting jig which is mounted on said beam charging apparatus for holding a beam, such that the door inner member can be handed over among said beam setting jig and said transfer jig of each of said transfer apparatuses.

2. An apparatus according to claim 1, further comprising:
    means for docking said welding jig and said transfer jig of said first transfer apparatus;
    means for docking said outer panel setting jig and said transfer jig of said second transfer apparatus;
    a first jig stocking apparatus provided on a side of said tack-welding station such that said welding jig can be exchanged to and from said tack-welding station in a condition in which said transfer jig of said first transfer apparatus is docked with said welding jig; and
    a second jig stocking apparatus provided on a side of said assembling station, such that said outer panel setting jig can be exchanged to and from said assembling station in a condition in which said transfer jig of said second transfer apparatus is docked with said outer panel setting jig.

3. An apparatus according to any of claim 1 or 2, further comprising a plurality of stocking means provided in a line along a path of travel of said beam charging apparatus between said reinforcing-welding station and said beam setting station, said stocking means being arranged to detachably hold said beam setting jig for handing said beam setting jig over to and from said beam charging apparatus.

4. An apparatus according to claim 1, further comprising an outer panel setting station on a side of said assembling station, a stiffener combining station provided between said assembling station and said outer panel setting station for setting and combining a stiffener to the outer panel, and transfer means for transferring the outer panel from said outer panel setting station to said assembling station through said stiffener combining station.

5. An apparatus according to claim 4, further comprising: a stiffener feeding apparatus provided on a side of said stiffener combining station; a setting robot which is reciprocated between said feeding apparatus and said stiffener combining station; a tool which is mounted on said setting robot for holding the stiffener such that the stiffener to be supplied by said feeding apparatus can be transported by said robot to said stiffener combining station for setting said stiffener to said outer panel; and a plurality of stocking means provided in a line along a travel path of said setting robot, each of said stocking means detachably holding said tool for handing over to and from said setting robot.

* * * * *